(12) United States Patent
Müller et al.

(10) Patent No.: US 6,857,655 B2
(45) Date of Patent: Feb. 22, 2005

(54) AIRBAG APPARATUS AND MOUNTING AND OPERATING METHOD FOR SAME

(75) Inventors: Olaf Müller, Rüsselsheim (DE); Jörn Kessler, Langen (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 10/068,721

(22) Filed: Feb. 6, 2002

(65) Prior Publication Data

US 2002/0163166 A1 Nov. 7, 2002

(51) Int. Cl.$^7$ .............................................. B60R 21/20
(52) U.S. Cl. ................................................. 280/728.3
(58) Field of Search .......................... 280/728.3, 728.1, 280/728.2, 732, 733

(56) References Cited

U.S. PATENT DOCUMENTS

| | | | | |
|---|---|---|---|---|
| 5,398,961 A | * | 3/1995 | Rogers et al. | 280/728.3 |
| 5,897,135 A | * | 4/1999 | Oehm | 280/728.3 |
| 5,899,488 A | * | 5/1999 | Muller | 280/728.3 |
| 6,126,195 A | | 10/2000 | Lutz | |
| 6,161,864 A | * | 12/2000 | Heilig | 280/728.2 |
| 6,315,321 B1 | * | 11/2001 | Lutz | 280/728.3 |
| 6,349,963 B1 | * | 2/2002 | Muller | 280/728.3 |
| 6,523,854 B1 | * | 2/2003 | Muller | 280/728.3 |
| 6,527,295 B2 | * | 3/2003 | Muller | 280/728.3 |

FOREIGN PATENT DOCUMENTS

| | | |
|---|---|---|
| DE | 197 26 878 A1 | 10/1998 |
| DE | 197 33 896 A1 | 2/1999 |
| DE | 197 50 182 A1 | 5/1999 |
| DE | 200 04 063 U1 | 7/2000 |
| DE | 100 25 417 A1 | 11/2000 |
| EP | 0 867 346 A1 | 9/1998 |
| JP | 05 050 893 | 3/1993 |
| WO | WO 99/61288 | 12/1999 |
| WO | WO 01/14172 A1 | 3/2001 |

\* cited by examiner

*Primary Examiner*—Faye M. Fleming
(74) *Attorney, Agent, or Firm*—Laurence A. Greenberg; Werner H. Stemer; Manfred Beck

(57) ABSTRACT

The invention relates to an airbag apparatus, with an airbag module and at least one covering device, behind which, in a closing position, an airbag expanding by gas inflation is accommodated and which, to release the expansion of the airbag, can be moved out of the closing position into an open position by means of a mechanism, the mechanism containing a first mechanism component, which is coupled firmly to the airbag module, and a second mechanism component, which is coupled firmly to the covering device, and the airbag module forming, together with the first mechanism component, a unit ready for installation. The invention relates, furthermore, to a mounting method for such an airbag apparatus, the mechanism containing a first mechanism component which is coupled firmly to the airbag module, so that the airbag module forms, together with the first mechanism component, a unit ready for installation, and containing a second mechanism component which is coupled firmly to the covering device, and, during or after the installation of the airbag apparatus behind a vehicle interior trim panel, the first mechanism component being brought into an active position with respect to the second mechanism component. The invention relates, further, to an operating method for such an airbag apparatus, the first mechanism component and the second mechanism component being coupled actively to one another only by means of a release of the airbag apparatus.

9 Claims, 20 Drawing Sheets

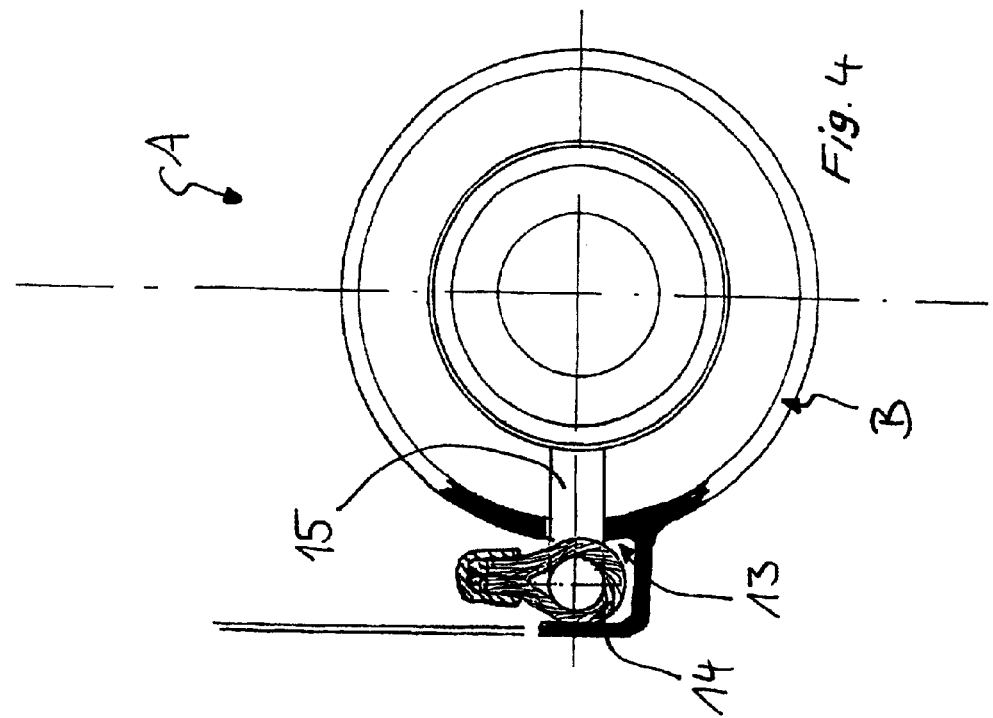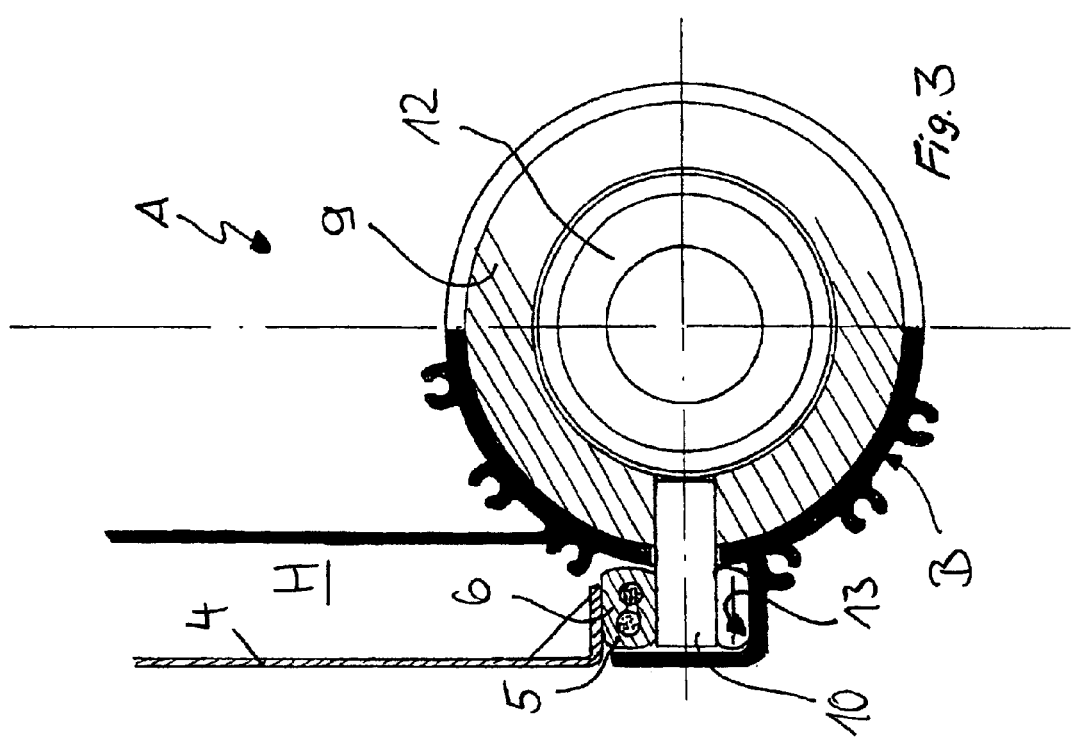

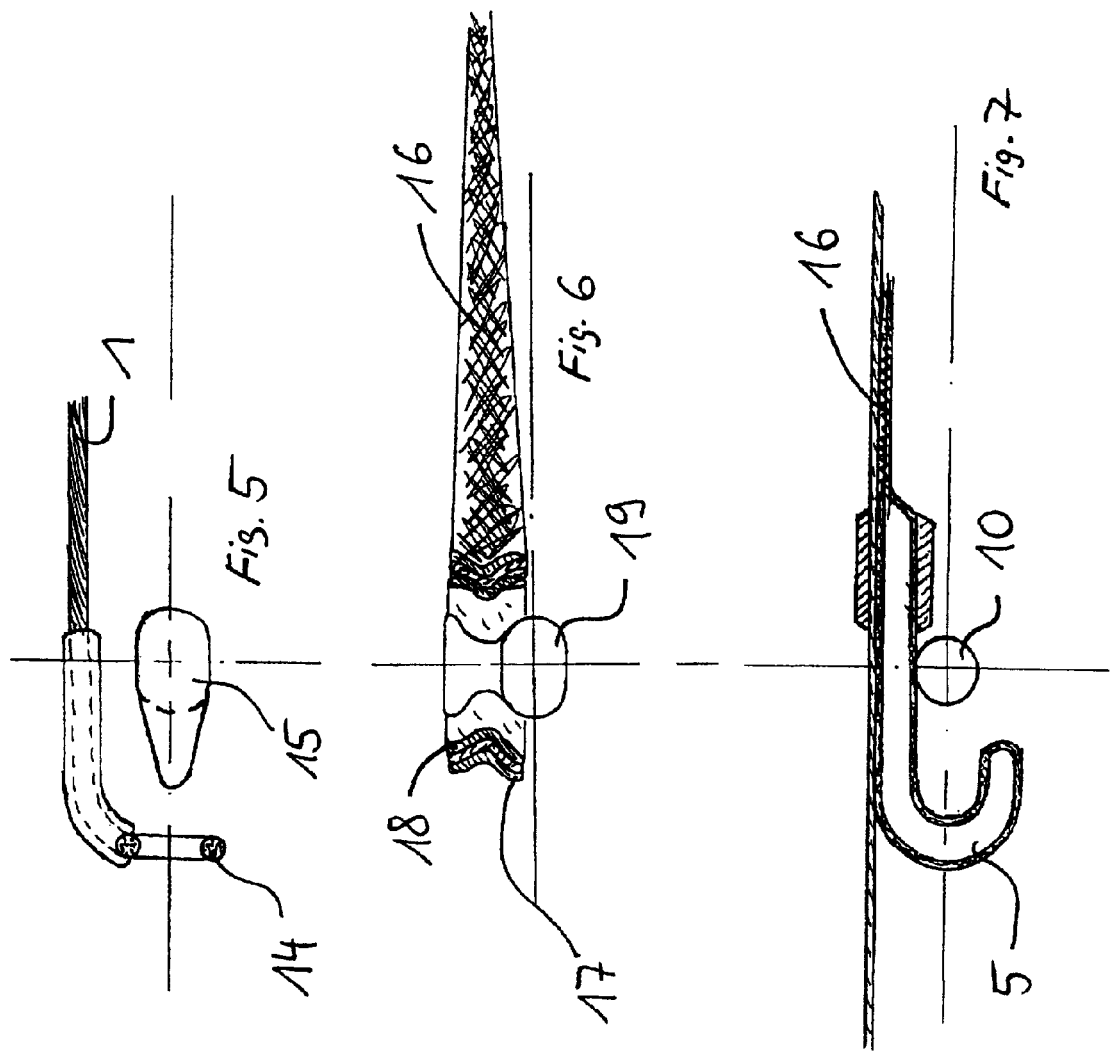

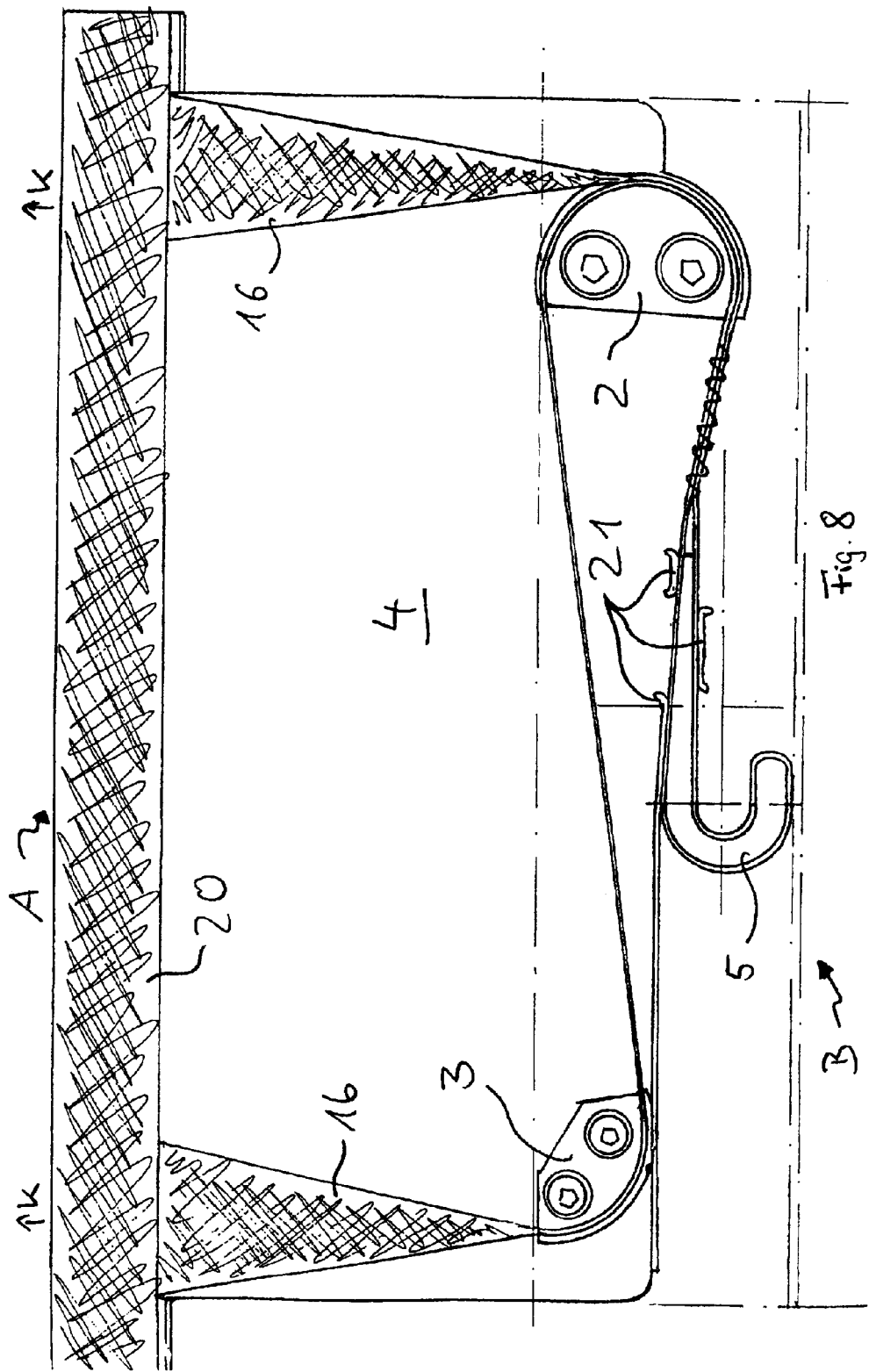

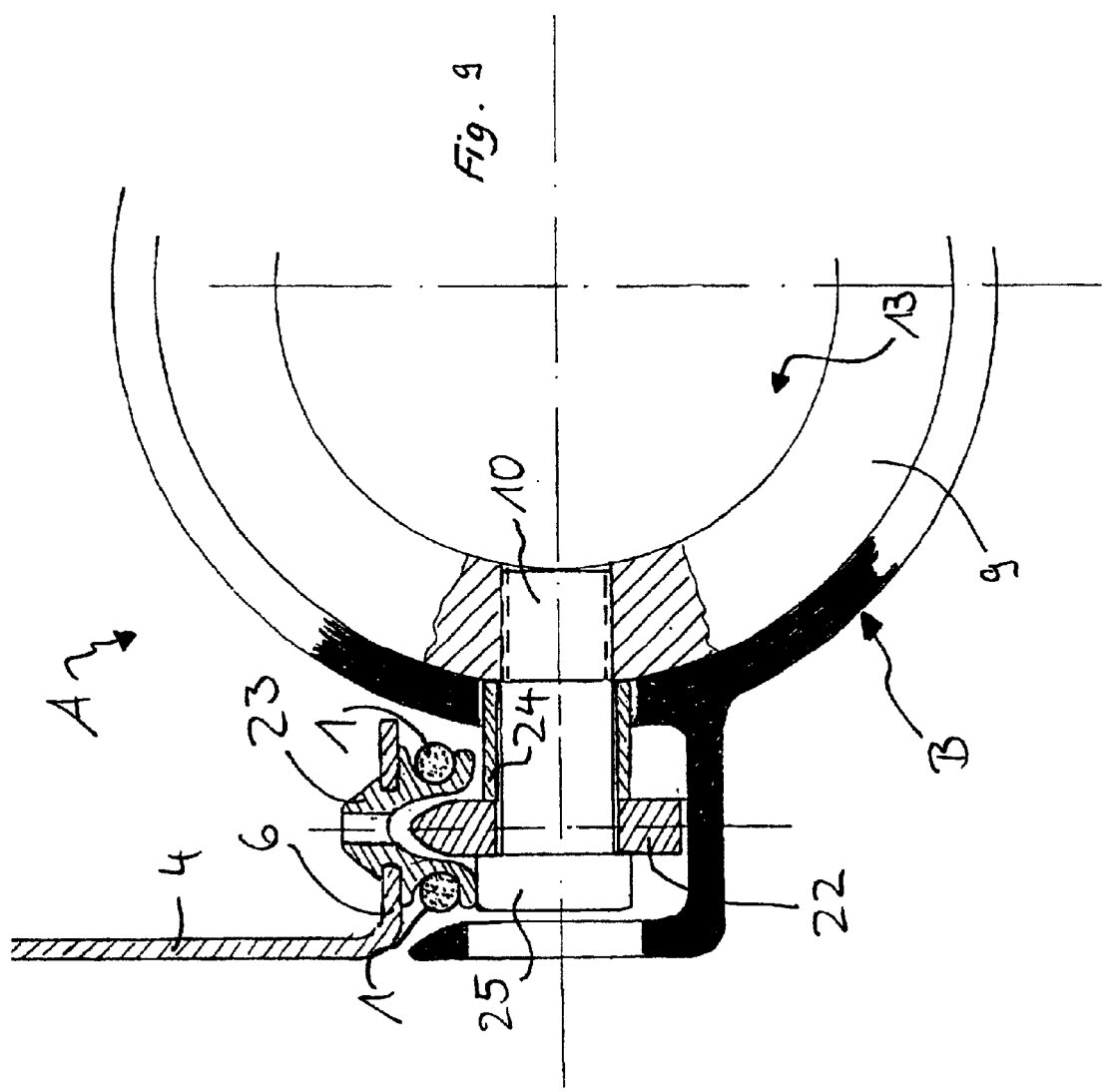

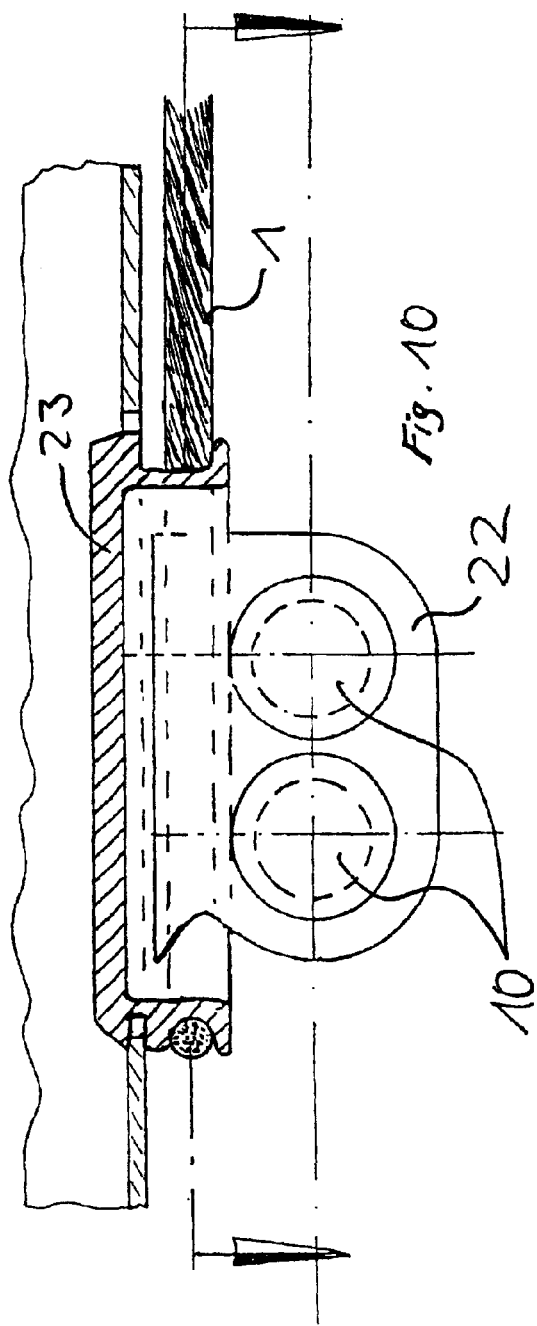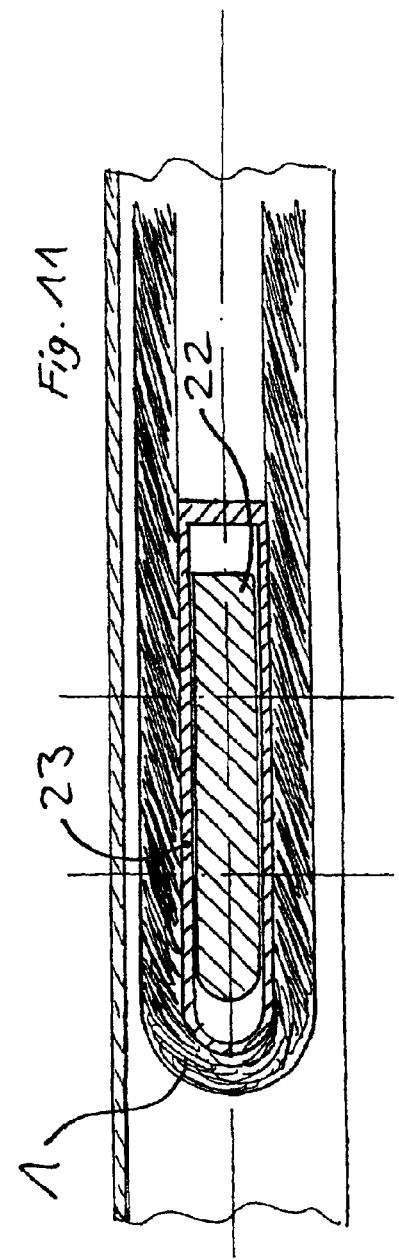

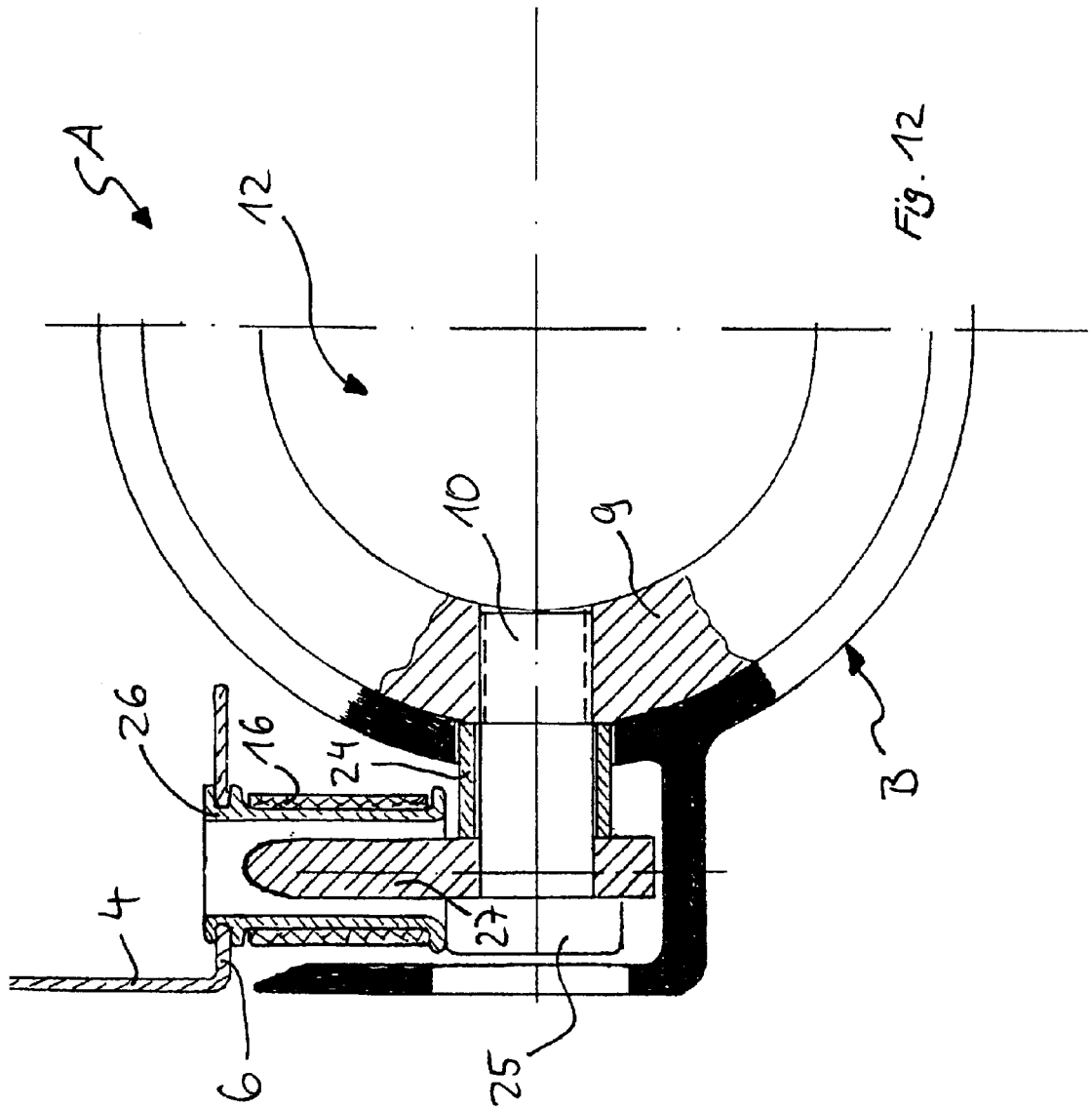

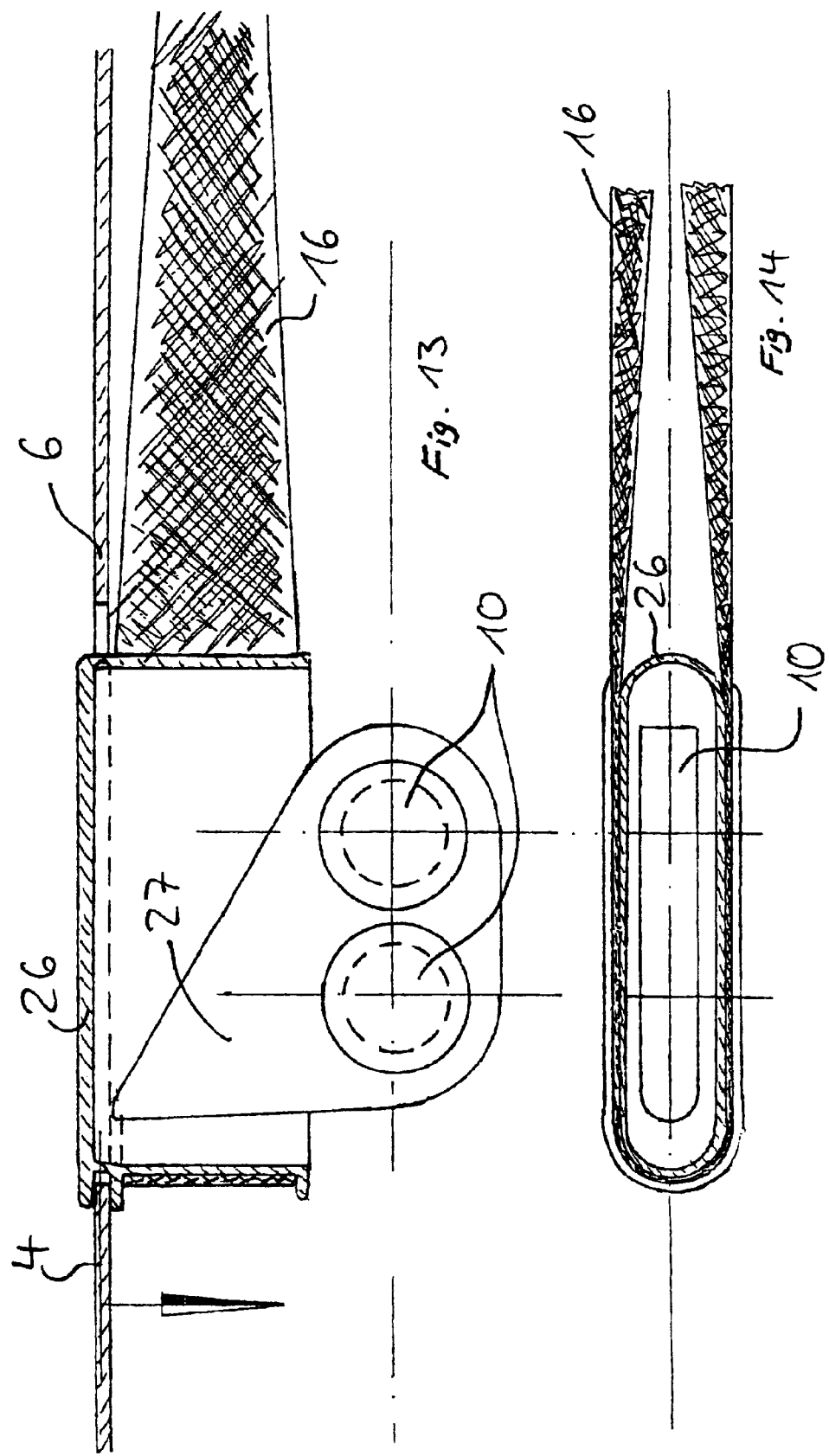

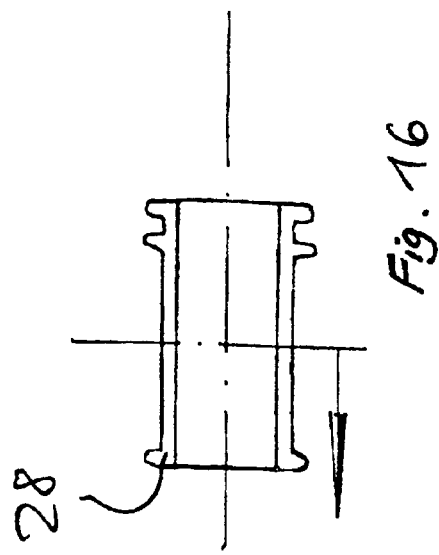
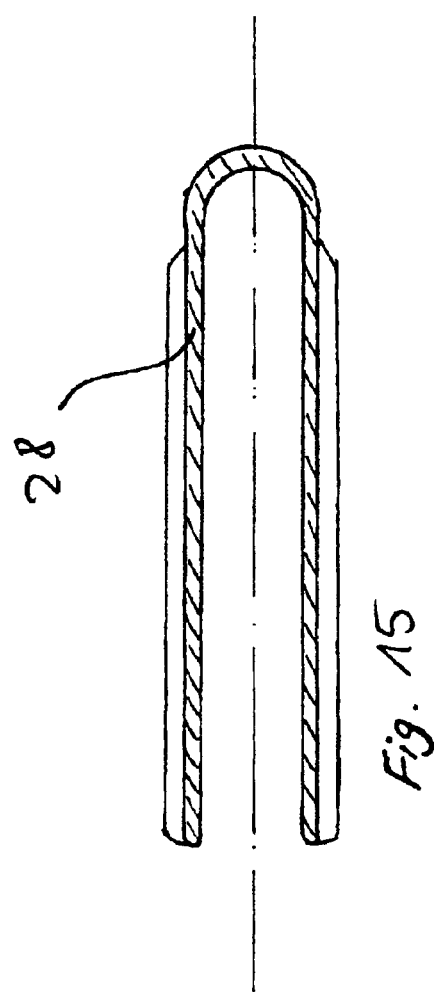

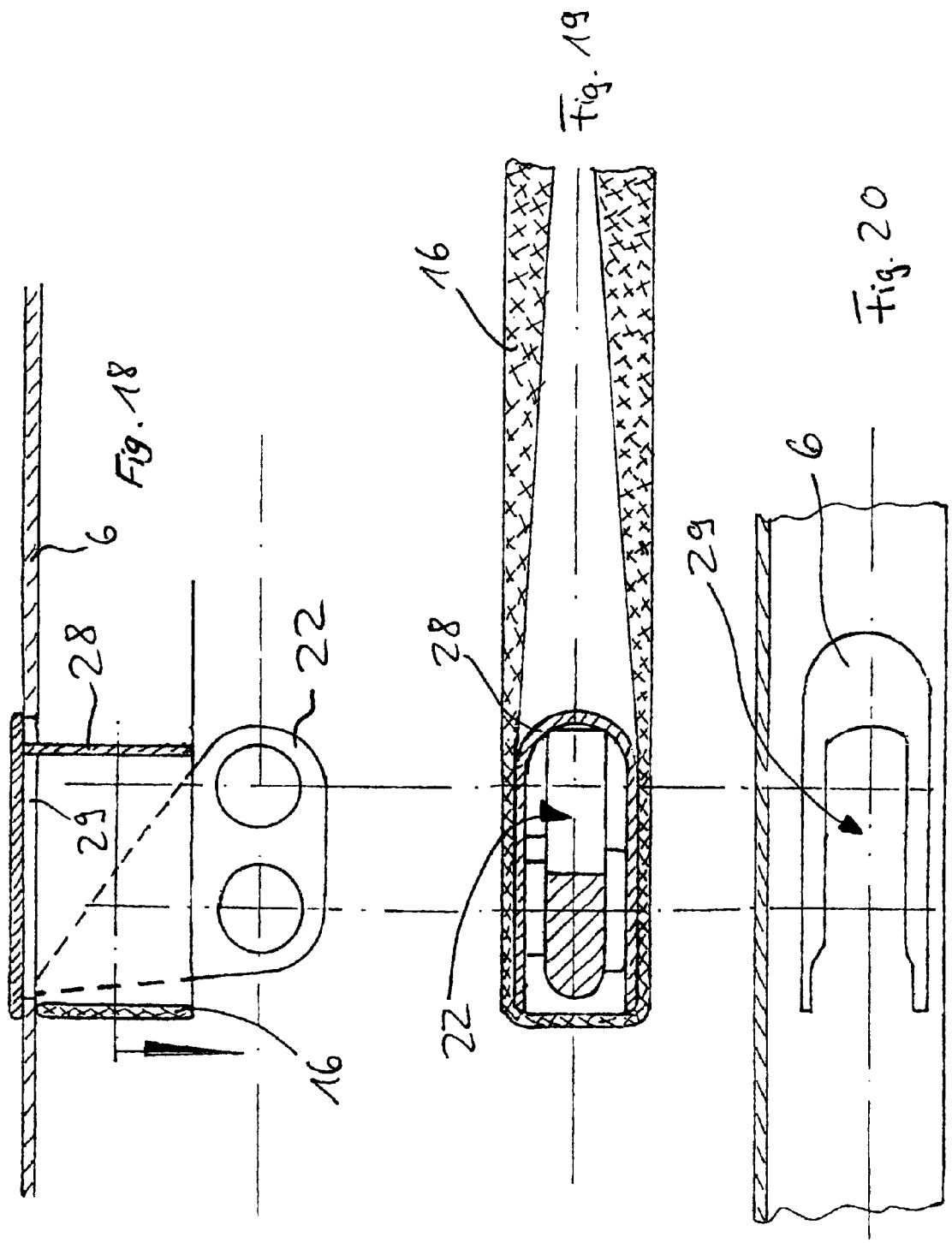

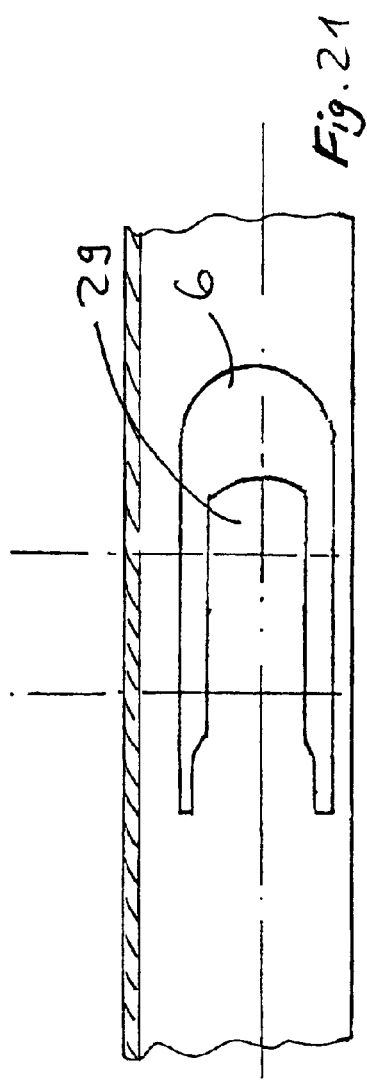
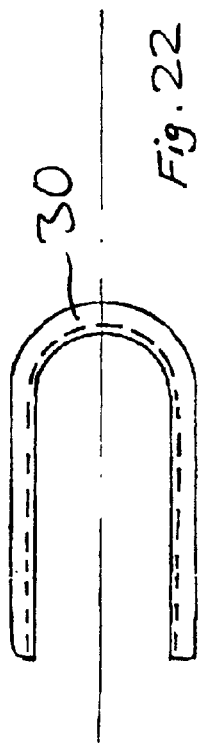
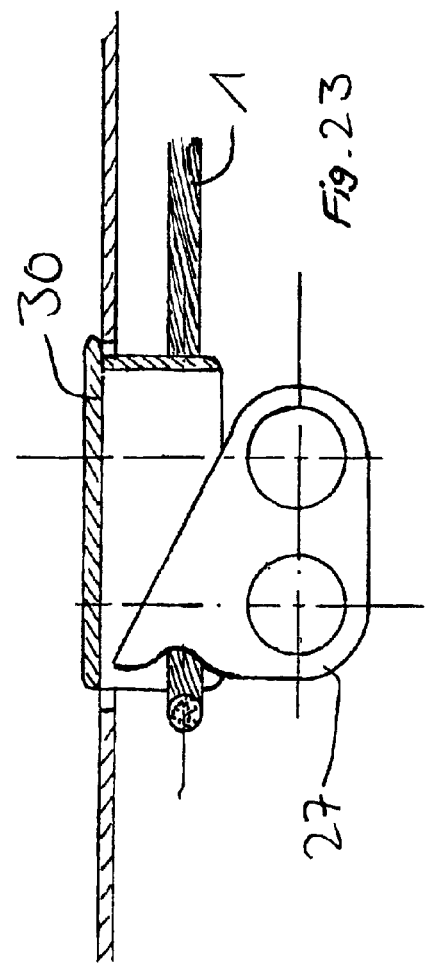

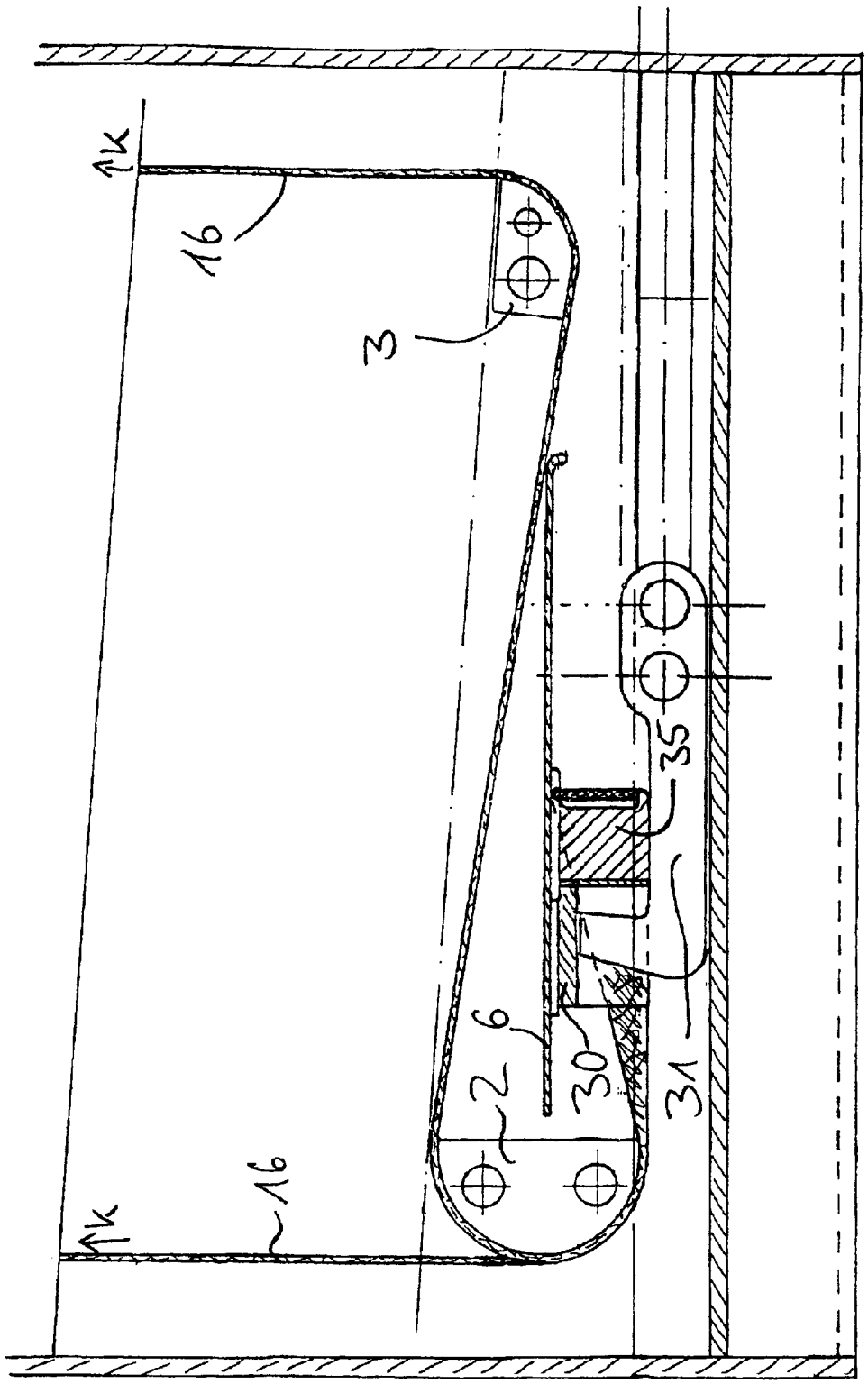

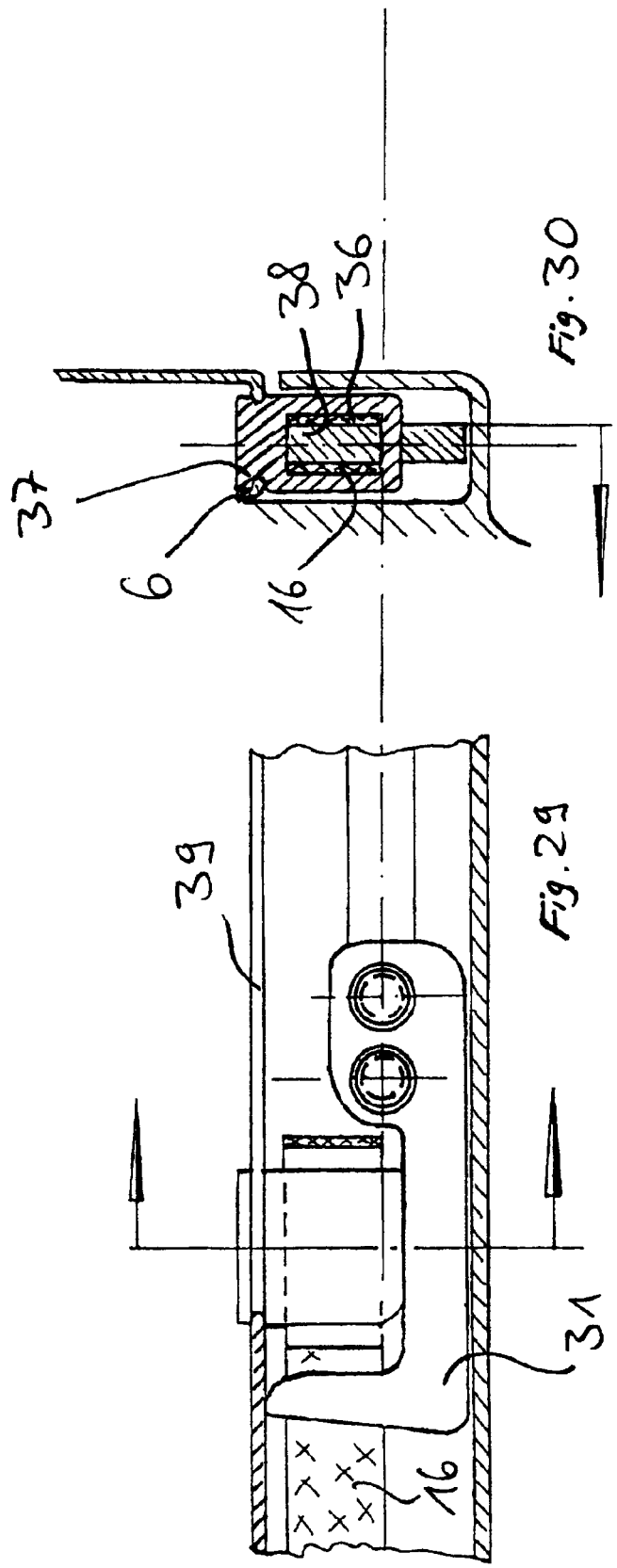

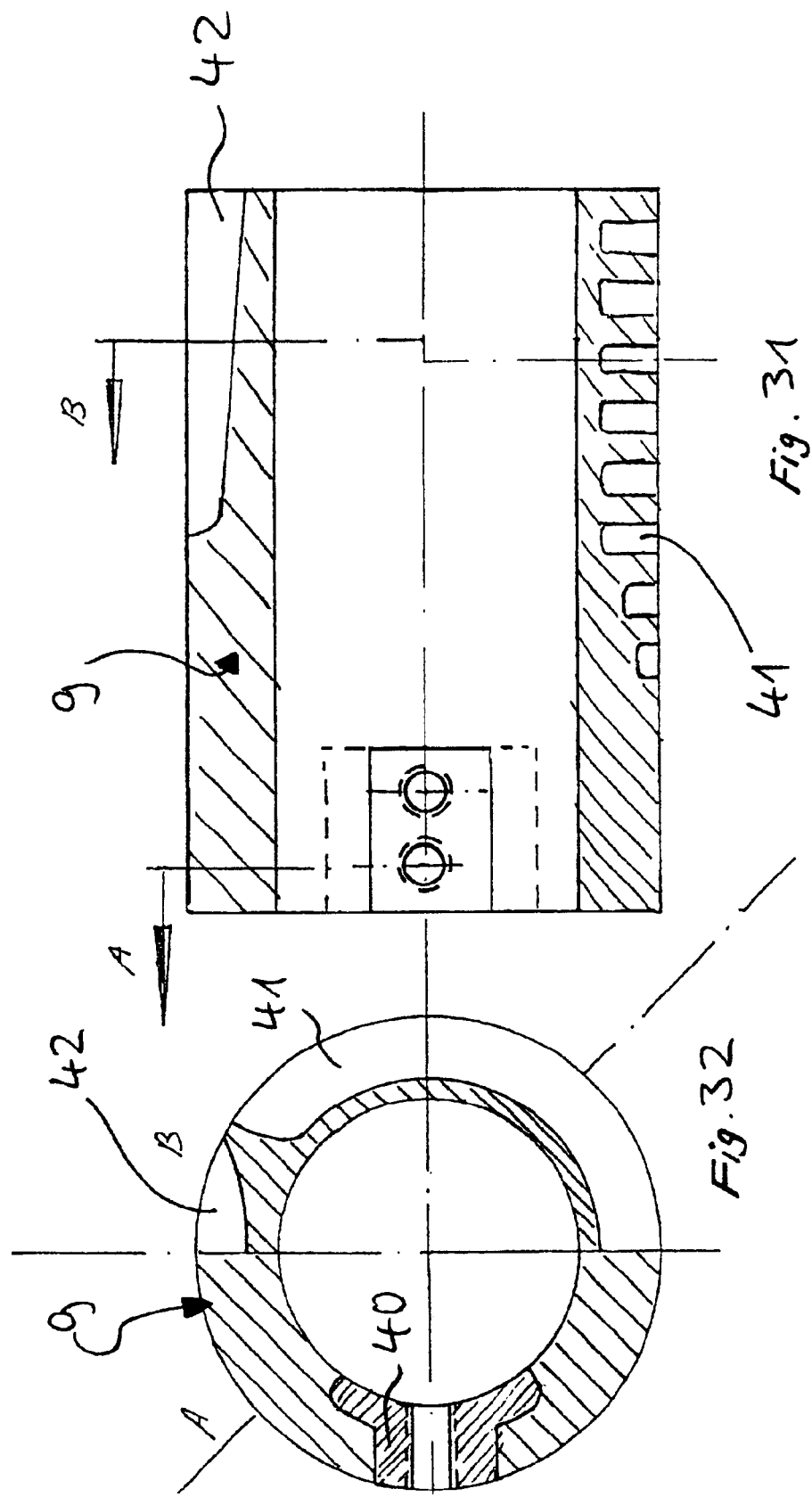

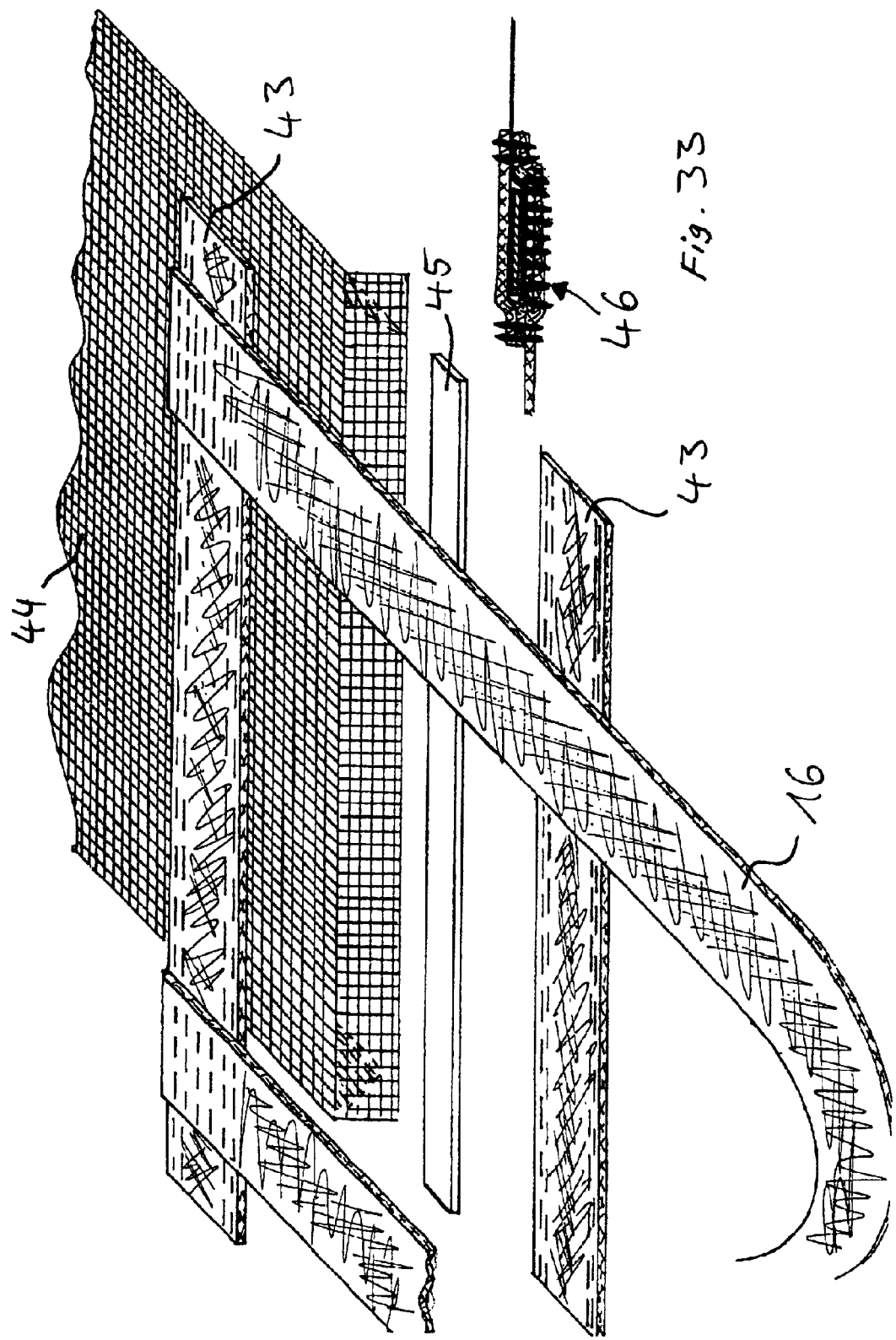

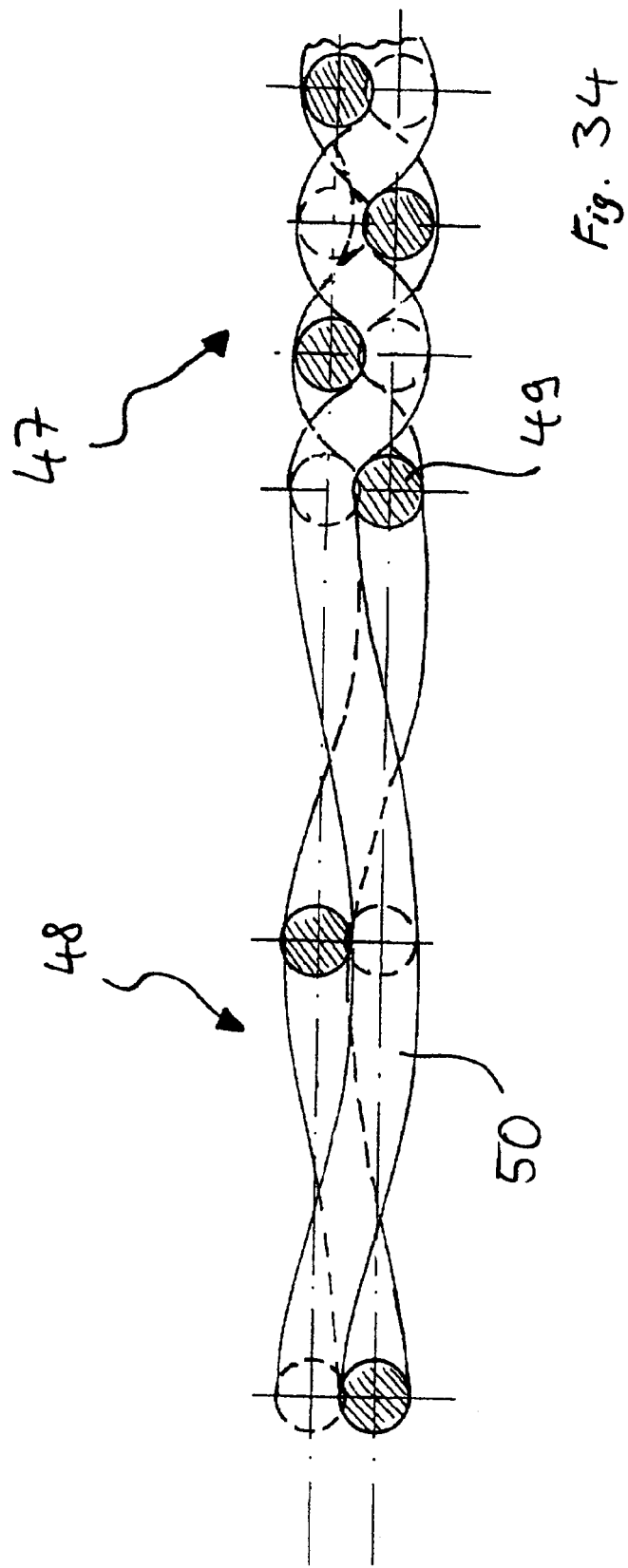

AIRBAG APPARATUS AND MOUNTING AND OPERATING METHOD FOR SAME

The invention relates to an airbag apparatus according to the preamble of claim 1, with a retractable covering lid, and to a mounting and an operating method for such an airbag apparatus.

The older German patent applications DE 197 12 782.7, DE 197 26 878 A1 and DE 197 33 896 A1, European patent application EP 98 10 55 51 A1, international patent applications PCT/DE 99/01564 and PCT/DE 00/02892 and also utility model applications DE 298 08 317.5, DE 298 09 554.8, DE 298 19 165.2, DE 298 20 722.2, DE 299 05 000.9, DE 299 05 919.7, DE 299 07 102.2, DE 299 08 946.0, DE 299 10 059.6 and DE 299 13 628.0, which are attributable, inter alia, to the present inventor, are concerned, in general, with an airbag apparatus and with a triggering method for this. The present invention relates to improvements of all the techniques and exemplary embodiments treated in the earlier application, in particular as regards the design of the airbag apparatus and the trigger control, and especially to a refinement for the control of an airbag lid, for which purpose the complete disclosure content of these older applications is hereby incorporated fully into the present documents by the references.

Such airbag lids are retracted into the module housing by means of a separate mechanism, before the airbag emerges from the instrument panel. The significance and purpose of airbag lids which are retracted into the module were described comprehensively by the present inventor, for example, in the older European patent application EP 0867346 A1, this being hereby incorporated fully into the present documents by reference in order to avoid mere repetitions. The fundamental idea of the invention is that the respective trim panel is removed not directly by means of the airbag, but via aids. What is achieved thereby is that the airbag, having lower pressure, cannot emerge aggressively and therefore cannot emerge with a risk of injury.

The object of the present invention is to further simplify known airbag apparatuses and their mounting and operating methods, in each case with retractable airbag lids.

This object is achieved by means of an airbag apparatus according to claim 1, a mounting method for such an airbag apparatus according to claim 7 and an operating method for such an airbag apparatus according to claim 9.

The present invention thus affords further advantageous possibilities for the refinement of an airbag apparatus and its operating and production methods according to and in respect of the abovementioned older applications. In particular, further advantageous mechanisms and drives for the opening of airbag lids, in particular an airbag lid opening mechanism with self-connecting airbag module tie-up, and also corresponding operating and production methods are provided.

In addition to the initially indicated earlier protective right applications for a mechanism for drawing the airbag lid into the module prior to the controlled inflation of the airbag, there is advantageously provision in the present invention, in terms of the design and the production method of an airbag apparatus, for mounting the opening mechanism in such a way that mounting or demounting of the actual airbag module can be carried out separately from the opening mechanism, without the opening mechanism being touched. Preferably, only in the event of a potential crash, a driver on the module engages the opening mechanism, as the operating method according to the invention for the airbag apparatus then intends.

According to the invention, in an airbag apparatus with an airbag module and at least one covering device, behind which, in a closing position, an airbag expanding by gas inflation is accommodated and which, to release the expansion of the airbag, can be moved out of the closing position into an open position by means of a mechanism, there is provision for the mechanism to contain a first mechanism component, which is coupled firmly to the airbag module, and a second mechanism component, which is coupled firmly to the covering device, and for the airbag module to form, together with the first mechanism component, a unit ready for installation.

In a further refinement of this, there is preferably provision, during mounting and demounting, for the first mechanism component and the second mechanism component, in principle, not to touch one another and to be coupled to one another only in a crash. Additionally or alternatively, there may be provision for traction elements, traction ropes or traction bands to be mounted, as integral parts of the second mechanism component, on or within a reinforcing box which supports an orifice for the emergence of the airbag in an instrument panel, in particular the traction elements, as integral parts of the second mechanism component, being combined in a hook positioned in relation to at least one driving bolt as an integral part of the first mechanism component, in turn as integral parts of the second mechanism component.

In a further advantageous refinement of the airbag apparatus according to the invention, the second mechanism component of the coupling mechanism and coverings of thereof are led through pockets, which are integrated in an extruded profile of the airbag housing, and, on the opposite side, through putaways of the reinforcing box. Furthermore, in this case, a rope loop or traction band loop and corresponding shaped or bent driving bolts may be provided.

In particular, an airbag apparatus according to the present invention may be characterized by at least one embodiment illustrated in the figures.

A mounting method for an airbag apparatus according to the present invention comprises the fact that the mechanism contains a first mechanism component which is coupled firmly to the airbag module, so that the airbag module forms, together with the first mechanism component, a unit ready for installation, and contains a second mechanism component which is coupled firmly to the covering device, and that, during or after the installation of the airbag apparatus behind a vehicle interior trim panel, the first mechanism component is brought into an active position with respect to the second mechanism component. In this case, in particular, during or after the installation of the airbag apparatus behind a vehicle interior trim panel, the first mechanism component and the second mechanism component may be coupled to one another.

The method for or during the operation of an airbag apparatus according to the invention may be such that the first mechanism component and the second mechanism component are coupled actively to one another only by means of a release of the airbag apparatus.

Further preferred and advantageous embodiments of the invention may be gathered from the present documents in their entirety.

Insofar as, to explain the invention, the present documents refer to a front passenger airbag apparatus which is designed as an airbag module with a retractable airbag lid, this serves merely for exemplary illustration. The invention is not restricted to applications in the case of front passenger airbag apparatuses, but may also be used advantageously in the case of airbag apparatuses other than front passenger airbag apparatuses.

The invention is explained in more detail, purely by way of example, with reference to the below-described exemplary embodiments and examples of use illustrated in the drawings, in which:

FIG. 1 shows, in section, a diagrammatic overview illustration of an airbag apparatus according to the invention, FIG. 2 shows a diagrammatic partial top view of a first exemplary embodiment of an airbag apparatus, FIG. 3 shows a diagrammatic partial cross-sectional view of the airbag apparatus of the first exemplary embodiment of FIG. 2, FIG. 4 shows a variant of the first exemplary embodiment of the airbag apparatus of FIG. 2 in a diagrammatic partial cross-sectional view similar to that of FIG. 3, FIG. 5 shows a diagrammatic sectional view of a detail of the illustration of FIG. 4 of the variant of the first exemplary embodiment of the airbag apparatus of FIG. 2, FIG. 6 shows a first alternative to the variant of the first exemplary embodiment of the airbag apparatus of FIG. 2 in a diagrammatic sectional view of a detail similar to the illustration of FIG. 5, FIG. 7 shows a second alternative to the variant of the first exemplary embodiment of the airbag apparatus of FIG. 2 in a diagrammatic sectional view of a detail similar to the illustration of FIG. 5, FIG. 8 shows a diagrammatic partial top view of a second exemplary embodiment of an airbag apparatus, FIG. 9 shows a diagrammatic partial cross-sectional view of an essential refinement of a third exemplary embodiment, FIGS. 10 and 11 show diagrammatic sectional views of a detail of the illustration of FIG. 9 of the third exemplary embodiment of the airbag apparatus, FIG. 12 shows a diagrammatic partial cross-sectional view of an essential refinement of a fourth exemplary embodiment, FIGS. 13 and 14 show diagrammatic sectional views of a detail of the illustration of FIG. 12 of the fourth exemplary embodiment of the airbag apparatus, FIG. 15 shows a diagrammatic partial cross-sectional view of an essential refinement of a fifth exemplary embodiment, FIG. 16 shows a diagrammatic side view of the illustration of FIG. 15 of the fifth exemplary embodiment of the airbag apparatus, FIG. 17 shows a diagrammatic sectional view of the fifth exemplary embodiment of the airbag apparatus in an overview, taking into account the detail from FIGS. 15 and 16, FIGS. 18 to 20 show further diagrammatic sectional views of the fifth exemplary embodiment of the airbag apparatus based on FIGS. 15 and 16, FIGS. 21 to 23 show diagrammatic sectional views of a variant of the fifth exemplary embodiment of the airbag apparatus similar to the illustrations in FIGS. 18 to 20, FIG. 24 shows a diagrammatic sectional view of the variant of the fifth exemplary embodiment of the airbag apparatus according to FIGS. 21 to 23 in an overview, taking into account the detail from FIGS. 21 to 23, FIG. 25 shows a diagrammatic partial top view of a sixth exemplary embodiment of an airbag apparatus, FIGS. 26 and 27 show diagrammatic sectional views of a detail of the illustration of FIG. 25 of the sixth exemplary embodiment of the airbag apparatus, FIG. 28 shows a further diagrammatic sectional view of a detail of the illustration of FIG. 25 of the sixth exemplary embodiment of the airbag apparatus with an additional alternative, FIGS. 29 and 30 show diagrammatic sectional views of a detail of a further variant of the sixth exemplary embodiment of the airbag apparatus in illustrations comparable to FIGS. 26 to 28, FIGS. 31 and 32 show diagrammatic sectional views of a further detail for the drive in an airbag apparatus, FIG. 33 shows a diagrammatic perspective part view of a further detail for the drive in an airbag apparatus, and FIG. 34 shows a diagrammatic partial sectional view of a traction band for the drive in an airbag apparatus.

The same reference symbols in the individual figures and images of the drawings designate identical or similar or identically or similarly acting components. The illustrations in the drawing also make clear those features which are not given reference symbols, irrespective of whether such features are described below or not. On the other hand, features which are contained in the present description, but cannot be seen or are not illustrated in the drawing, are also readily understandable to a person skilled in the art.

Individual features which are specified and/or illustrated in conjunction with actual exemplary embodiments are not restricted to these exemplary embodiments or to combination with the other features of these exemplary embodiments, but, within the framework of what is technically possible, may be combined with any other variants, even when these are not treated separately in the present documents.

The overall set-up, shown in FIG. 1 in an overview by means of a diagrammatic sectional illustration, of an airbag apparatus A with an airbag module B which contains a gas generator G and an airbag S and, if appropriate, a separate housing H therefor and which has at least one airbag lid K as a covering device, applies by way of example to all the embodiments of the invention which are illustrated in the figures of the drawings and are treated below. Furthermore, the airbag module B is assigned a drive T which is coupled to the airbag lid K via a mechanism M consisting of two mechanism components M1 and M2. The mechanism component M1 is in principle connected firmly to the drive T, and the mechanism component M2 is in principle connected firmly to the airbag lid K.

The airbag module B, together with the drive T, on the one hand, and the at least one airbag lid K, on the other hand, are mounted separately on a structure of a vehicle (not shown), such as, for example, an instrument panel V or its member R. During this mounting, the mechanism components M1 and M2 are then coupled at a coupling point P or brought into active connection in such a way that, before the airbag S emerges from an accommodation space U through an orifice O, initially closed by the at least one airbag lid K, in an instrument panel V or in a steering wheel (not shown), the airbag lid K is drawn away from the drive T, so that the airbag S, then being inflated with compressed air from the gas generator G and consequently expanding, can, unimpeded, emerge and move through said orifice O toward an occupant (not shown), in order to protect the latter in the event of an accident.

It is essential, in this case, that the airbag module B or at least the drive T, on account of a pyrotechnic charge for the latter, is installed only at a relatively late juncture in the vehicle to be thus equipped and that, nevertheless, a reliable tie-up of the mechanism component M1 to the mechanism component M2 is achieved. This is important because, on the one hand, it is necessary to have specially trained and qualified personnel for directly handling the pyrotechnic charge and, on the other hand, impairment of this pyrotechnic charge due to subsequent mounting work is avoided or reduced.

In the following text dealing with details of the individual exemplary embodiments and also variants of these and alternatives to them, according to the figures of the drawings, the above basic set-up is presupposed and is not particularly explained again each time.

FIG. 2 shows an exemplary embodiment of an airbag apparatus A having the above basic set-up, explained with reference to FIG. 1, which, moreover, may also be gathered from the embodiments according to the earlier protective right applications indicated initially and which contains mechanism components M1 and M2 which are deflected or, in other words, contain deflections. Traction ropes 1, on the one hand, and a large deflection 2 and a small deflection 3, on the other hand, are mounted, as integral parts of the mechanism components M2 and M1, within, for example, an extruded profile or rectangular reinforcing or sheet-metal box 4 which forms the housing H of the airbag module B and is supported on an instrument panel member R so as to be positioned around an airbag orifice O which, before a release of the airbag apparatus A, is closed, in particular flush with the instrument panel V, by the at least one airbag lid K. The traction ropes 1 terminate, clinched, in a driving hook 5. This driving hook 5 belongs, together with the traction ropes 1, to the mechanism component M2 on the same side as the airbag lid K and is held, positioned, on a sheet-metal putaway 6 of the sheet-metal box 4 by means of a clamp 7 or the like belonging to the mechanism component M1. The end 8 of the sheet-metal putaway 6 forms a holding stop for the clamp 7. This mounting is carried out in the sheet-metal box 4 after the sheet-metal box 4 is mounted on the instrument panel member (not shown).

The airbag module B is provided with a piston 9, as an integral part of the drive T, which is equipped on both sides with driving bolts 10 as an integral part of the first mechanism component M1. The driving bolts 10 are positioned in such a way that they come to lie in front of the open driving hook 5 which can tilt, for example, through 7.5°. In the event of a crash, these driving bolts 10 move into the driving hooks 5, while being guided in slots 11. Thus, in this exemplary embodiment, the coupling or active connection of the mechanisms M1 and M2 takes place only as a result of or during the release of the airbag apparatus A.

FIG. 3 shows a cross section through the airbag module B, through driving bolt 10, driving hook 5, sheet-metal box 4, the sheet-metal putaway 6 and a generator 12 which can be identical to the gas generator G for the compressed gas for inflating the airbag S or a separate stage of this gas generator G or a separate gas generator. The section shows that, during a crash, the driving hook 5 is forcibly led between the airbag module B, equipped correspondingly with "pockets" 13, and the sheet-metal putaway 6 of the sheet-metal box 4.

FIG. 4 shows an alternative, in which the end of the traction ropes 1 terminates in a rope loop 14. The driver provided for this purpose is a bent driving bolt 15. FIG. 5 shows this arrangement in section.

FIG. 6 shows the use of traction bands 16 as an alternative to the traction ropes 1.

FIG. 7 shows an alternative, in which the driving hook 5 is surrounded functionally by the traction bands 16 and, for example, is adhesively bonded to these for fastening.

Figure 1:
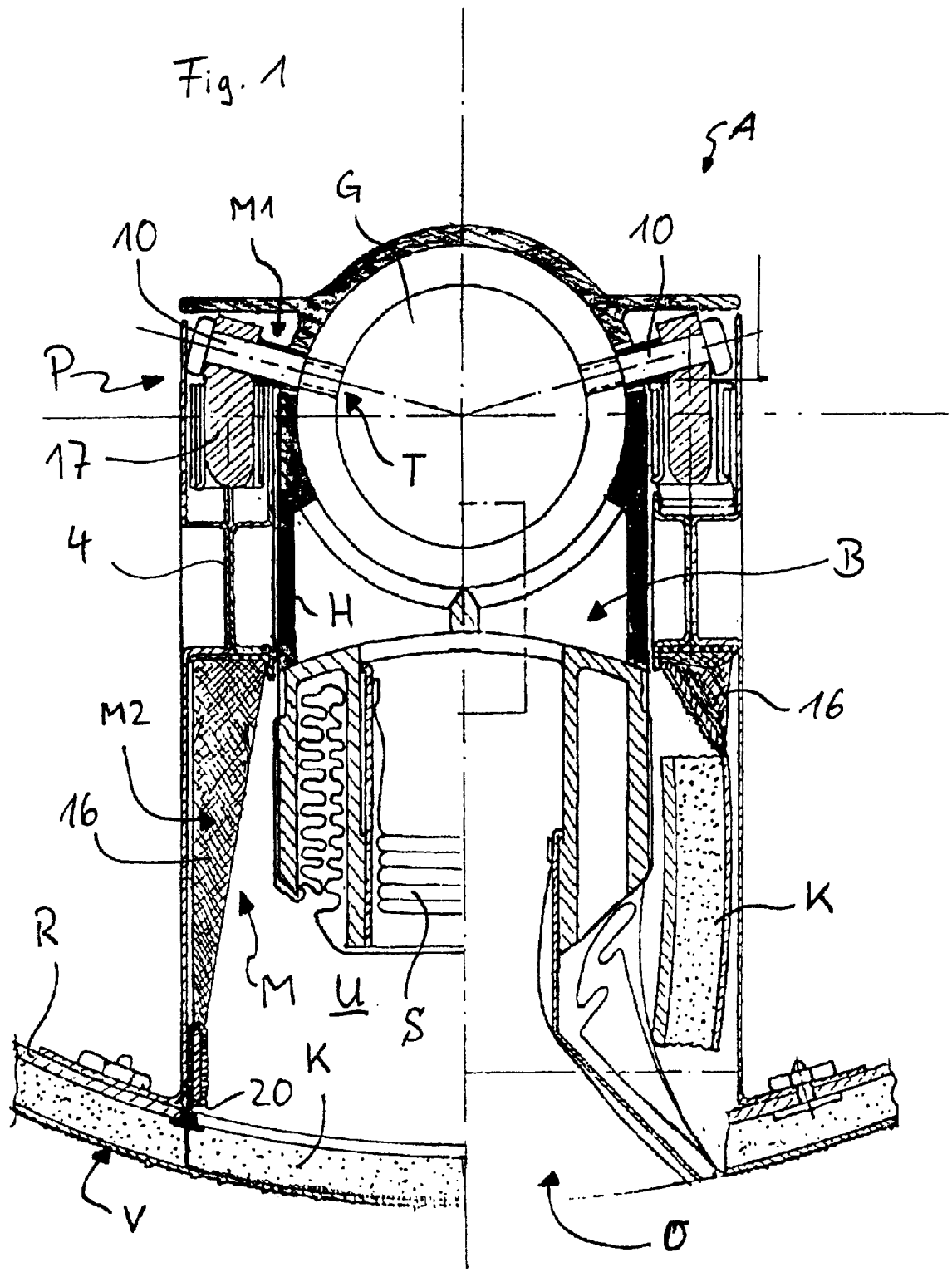

FIG. 8 shows the assembly of a wall of the sheet-metal box 4 together with the large and small deflections 2 and 3, the traction bands 16 and a driving hook 5, around which the traction bands 16 are adhesively bonded virtually in one piece. This driving hook 5 is retained, positioned, between sheet-metal protuberances 21.

FIG. 9 shows a further exemplary embodiment with a further alternative to a rope traction mechanism, in which a driver 22 is fastened to a driving bolt 10 between a driving bolt head 25 and supporting sleeves 24. The traction ropes 1 are mounted on a special mounting ring 23. The driver 22 is automatically inserted from below into this mounting ring 23 during the mounting of the airbag module B.

For further clarification, FIGS. 10 and 11 and show in a vertical longitudinal section and a horizontal cross section the technique which is illustrated in section in FIG. 9. The position of the driver 22 and its shape for driving the traction ropes 1 and the tie-up of the driver 22 to the driving bolt 10 are illustrated in each case.

FIGS. 12, 13 and 14 show an alternative to the tie-up of the mechanism with traction bands 16, in the case of a correspondingly differently designed mounting ring 26 and driver 27, in all sections (x, y, z).

Figure 17:
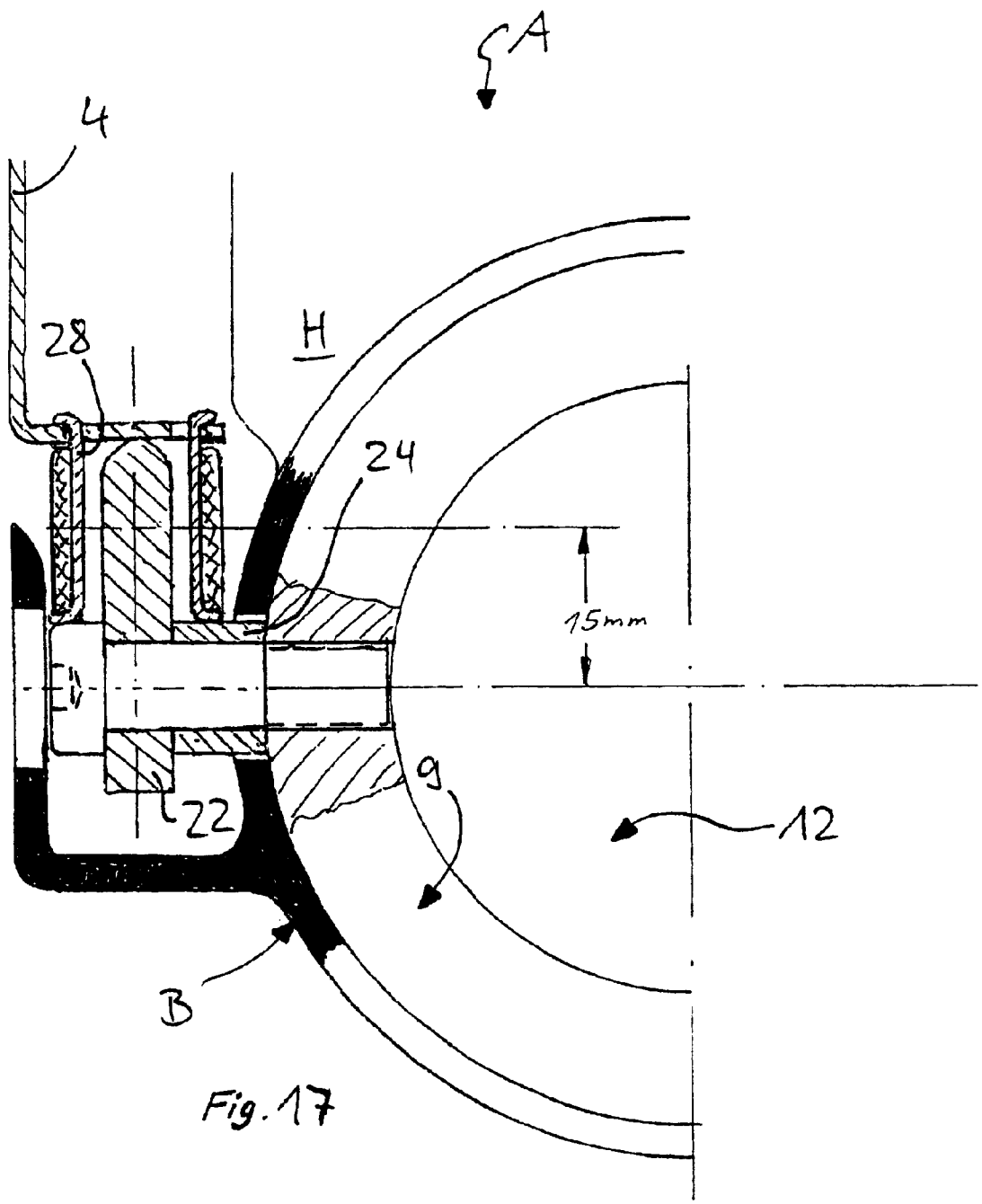

FIGS. 15, 16 and 17 show an alternative to the tie-up of the traction bands 16 on a differently designed driver 22. This driver 22 (view in FIG. 16 and section in FIG. 15) is of the "open" type. The driver 22 consequently remains in the sheet-metal box 4. The driver 22 grips only the loop of the traction bands 16 in the event of a crash and drives it. The assembly is shown in FIG. 17, which also contains an example of a given quantity. FIG. 18 shows, in relation to this, a vertical section through the "open" mounting ring. FIG. 19 shows the horizontal section and FIG. 20 the punched-out portion 29 in the sheet-metal putaway 6, onto which the mounting ring 26 open on one side is slipped.

Figure 24:
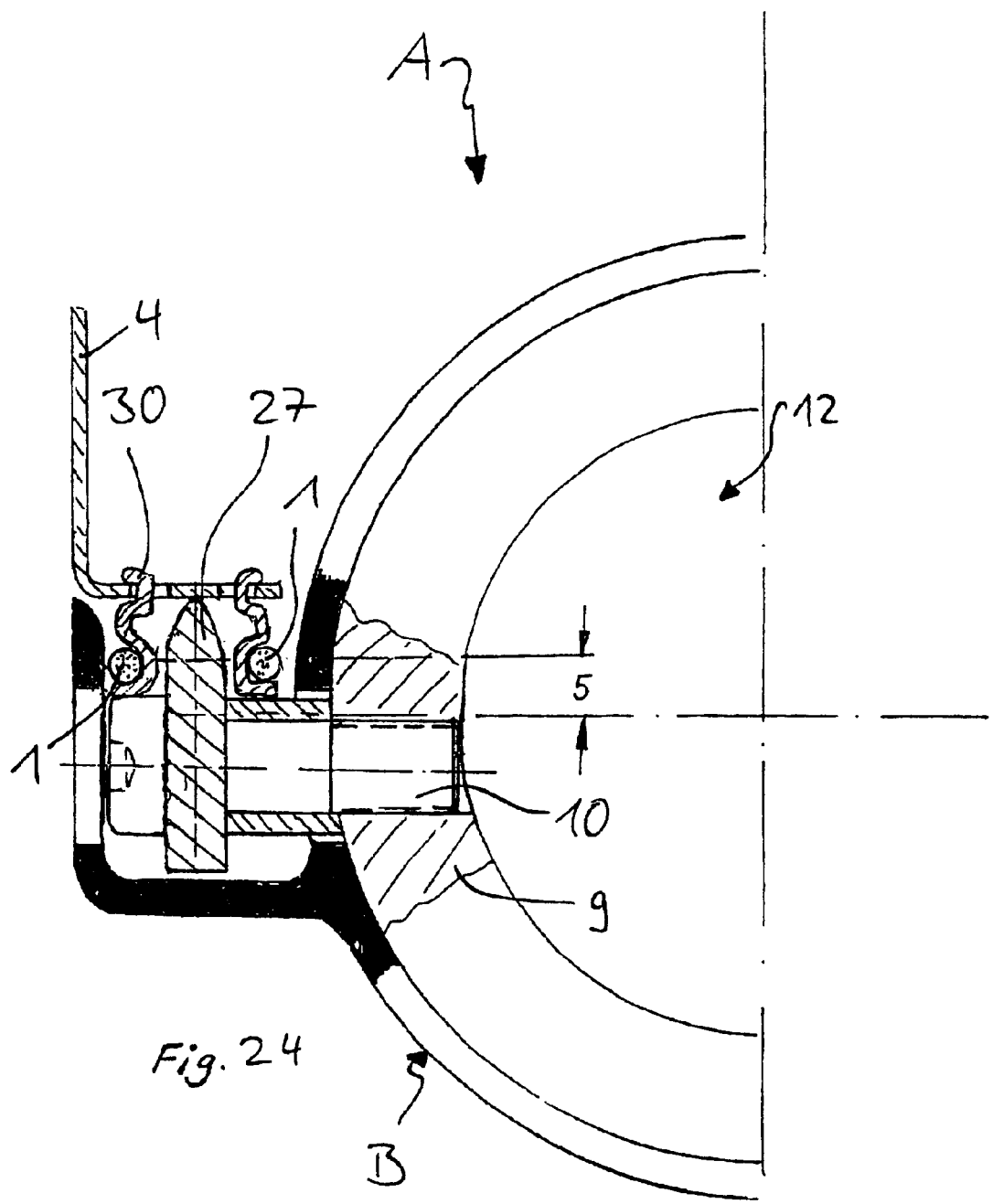

FIGS. 21, 22 and 23 show the same variant of the invention as an alternative with traction ropes. A differently designed "open" mounting ring 30 is required for this purpose. This mounting ring is likewise slipped into the punched-out portion 29 of the sheet-metal putaway 6. FIG. 24 shows, in cross section, the assembled arrangement, including an example of a given quantity.

Figure 27:
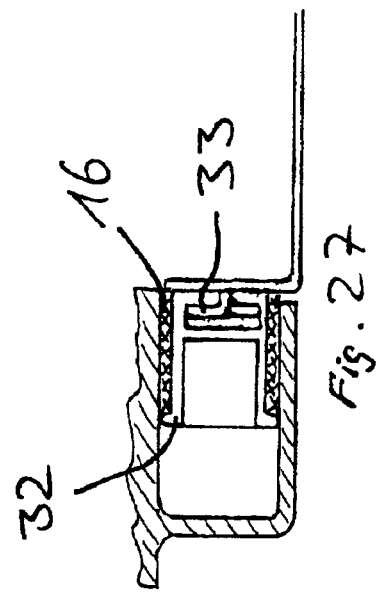

FIG. 25 shows a further package-optimized version with a drag lever 31 as a driver of the traction bands 16. The traction bands 16 are mounted on a specifically designed mounting ring 32 which, in this alternative, is in turn slipped onto a plurality of protruded sheet-metal noses 33 (see FIG. 26) which are shaped out of the sheet-metal putaway 6. The mounting ring 32 is positioned on a likewise integrally formed sheet-metal protrusion 34. FIG. 27 shows a vertical section through the design with a mounting ring 32 and traction bands 16, mounted on the sheet-metal noses 33.

Figure 26:
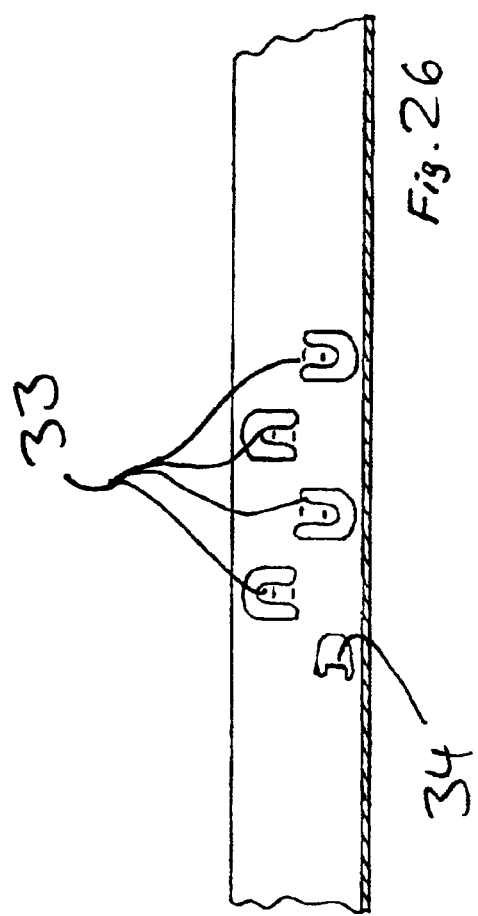
Figure 28:
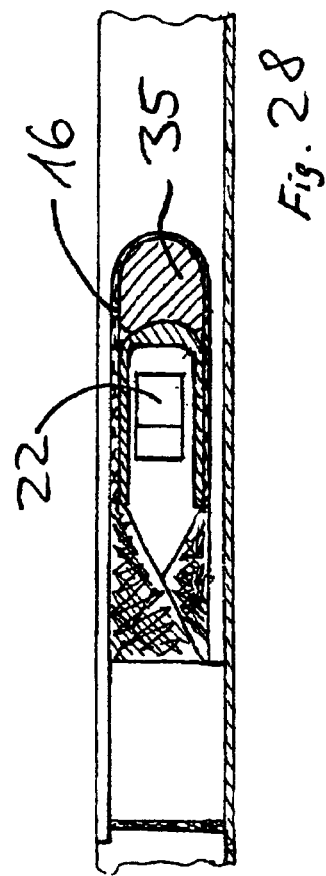

FIG. 28 shows a horizontal section through the version according to FIGS. 25 to 27 and, as a further special feature, the possibility of underfilling the length tolerance of the traction bands 16 at their loop 17 by means of a tolerance compensating block 35. Like the mounting ring, this tolerance compensating block 35 is also slipped onto the sheet-metal noses 33 or onto the mounting ring 32. As is shown, by virtue of this solution, the deflections of the traction bands 16 can be placed lower and the length tolerance of the traction bands compensated in the simplest possible way.

FIGS. 29 and 30 show another type of length tolerance compensation, as compared with the version shown in FIGS. 26 to 28. The loop 17 of the traction bands is inserted through a hole 36, conical on both sides or at least on one side, in a mounting part 37 made of material (for example, metal) and is wedged with individually adjustable prestress or band slack by means of a wedge 38. Alternatively, here, this mounting part 37 is inserted in a slot 39 and, guided in this slot 39, is driven by the drag lever 31 in the event of a crash. Further alternatives for the fastening of the mounting part 37 and its guidance were shown in the other alternatives. Further alternatives are within the scope of knowledge of a person skilled in the art.

FIGS. 31 and 32 show the piston 9 which drives the mechanism via the driving bolts 10. The special features of the piston 9 are that it is produced from thermal plastic with metallic reinforcements 40 for the driving bolts 10. The reinforcements may alternately also consist of a continuous ring (not shown). A further characteristic is the sealing-off of the piston by means of grooves 41 which, at the high gas velocities, generate a seal by means of vortices. These "vortex" seals may alternatively be attached to the inside and/or outside diameter. The edges of these grooves are designed in such a way that, at the high temperatures of the gases, they melt down and likewise seal additionally. Furthermore, the piston 9 has a coordinated clearance 42, by means of which, on the principle of the gas control of a two-stroke engine, the gas is introduced into the airbag in a manner coordinated with the movement of the lid opening mechanism M. The left and right halves of the illustration in FIG. 32 belong correspondingly to the sectional line A and sectional line B in FIG. 31. A die separating line is depicted by dashes and dots in FIG. 32.

FIG. 33 shows the arrangement of the traction mechanism with traction bands 16. The traction bands 16, along with two bands 43 distributing transverse load, are inserted, together with a fabric 44 of the instrument panel covering, into the instrument panel sheeting (not shown) of the latter. A metal strip 45 or the like is used to effect even better load distribution. The stitching 46 is shown in detail as a section.

FIG. 34 illustrates the function of low-stretch traction bands 16. According to the invention, the bands are of special construction. High strength is achieved in the stitching region 47 by means of closely arranged cross threads 49. The stretch is reduced in the traction region 48 by means of a wide spacing of the cross threads 49. As a result, in the traction region 48, the waviness of the longitudinal threads 50 and consequently the stretch under load are reduced.

It is essential, in the present invention, that an ACTIVE-DOOR mechanism (mechanism for actuating an airbag lid) is mounted and demounted separately from the airbag module. Preferably, in principle, this system is not touched during mounting and demounting, but is coupled together only in the event of a crash.

Figure 2:
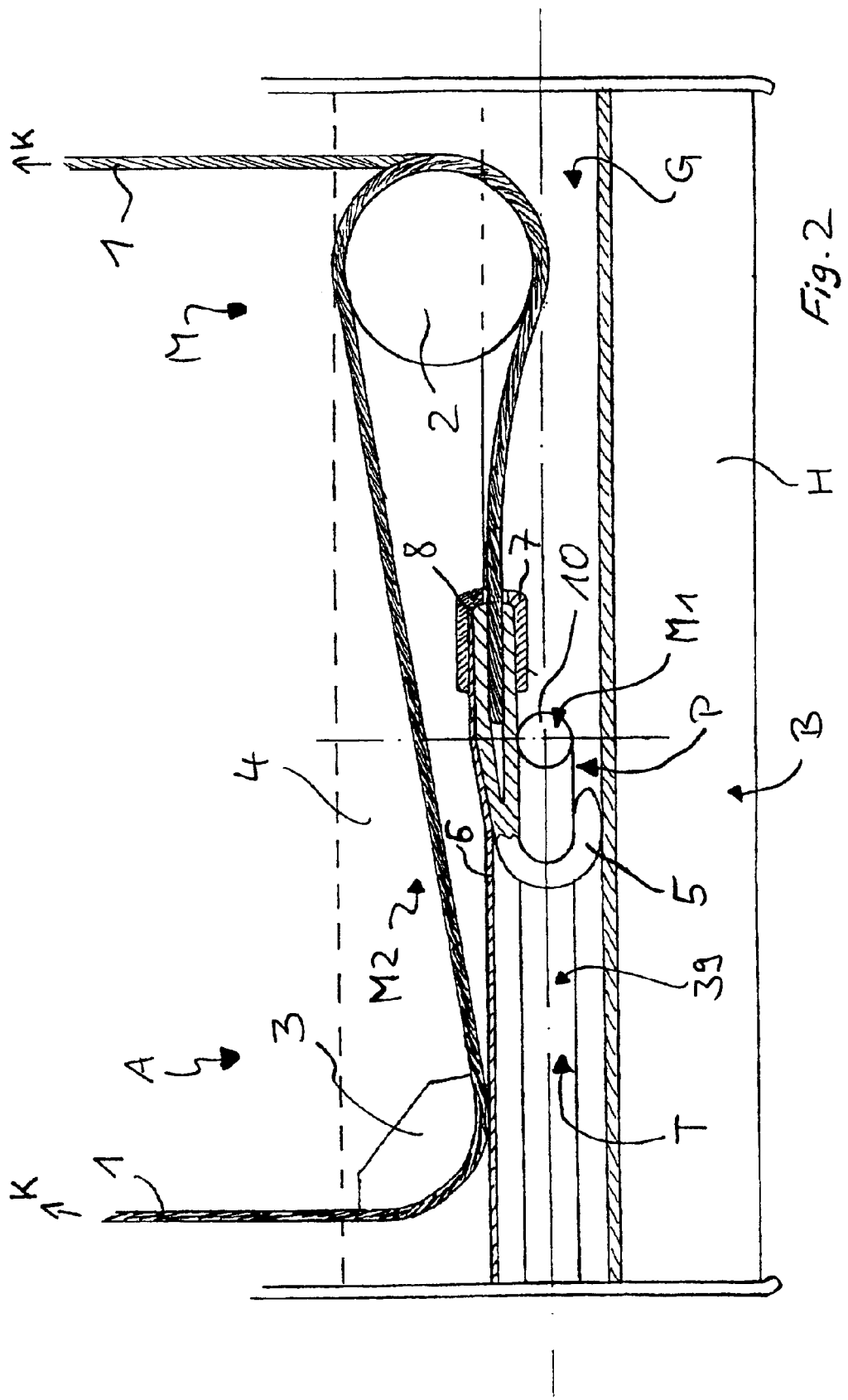

Preferably, the mounting of the traction ropes or traction bands or, in general, traction elements takes place within a reinforcing box which supports an airbag cutout in an instrument panel. It is preferred, furthermore, that the traction elements be combined in a hook positioned in relation to the driving bolts (for example, FIG. 2). The invention indicates, in this respect, specific tie-up techniques of the traction ropes or traction bands on the hook (for example, FIGS. 5, 6 and 7). Furthermore, guidance of the coupling mechanism and the covering of the latter may take place through pockets, which are integrated in the protruded profile of the airbag housing and, on the opposite side, through putaways of the reinforcing box (for example, FIG. 3).

A preferred alternative has a rope loop or traction band loop and correspondingly shaped or bent driving bolts (for example, FIGS. 4, 5 and 6). Alternatively, the tie-up of the hook may take place by means of a clamp or by means of sheet-metal protrusions. In a further alternative, the driver is inserted into a mounting ring (for example, FIGS. 9, 10 and 11) and is designed in a functionally appropriate manner, and so as to shear off, in the case of traction ropes or traction bands (for example, FIGS. 12, 13 and 14). Alternatively, the mounting ring may be open and be firmly mounted permanently (for example, FIGS. 15, 16 and 17) in a slot in the case of the version with bands. Another embodiment is firmly mounted permanently in a dimensionally appropriate punched-out portion, in which, in the version with bands (for example, FIGS. 18, 19 and 20), the mounting ring is held, fixed in position. This is also possible with ropes (for example, FIGS. 21, 22, 23 and 24).

A further alternative embodiment contains drag levers for package optimization and length tolerance compensation of the bands by means of inserted blocks (for example, FIG. 25). This may be developed by the mounting ring being fastened by means of sheet-metal noses, punched out and protruded from the putaway of the sheet-metal box of the instrument panel (for example, FIGS. 26, 27 and 28). Furthermore, otherwise or additionally, tolerance compensation by means of positionally optimized wedging in a wedge-shaped hole in the mounting part is possible (for example, FIGS. 29 and 30).

Moreover, a piston made of thermoplastic, with bolt reinforcement and receptacle (for example, FIGS. 31 and 32), may be used. The piston version may also contain "vortex" seals and meltdowns for leaktightness. There may also be provision for the piston to be designed as a control element for the specific forced control of gas to the airbag after the opening of the lids.

According to further preferred alternatives, the traction mechanism contains bands with load distribution bands and/or a load-distributing metal reinforcement, all of which preferably are stitched accordingly (for example, FIG. 33). In this case, preferably, the traction bands have, specifically in the stitching region, closely positioned crossbands for optimum strength. It is preferred, furthermore, if the traction bands are provided, specifically in the traction region, with only a few crossbands in order to reduce the waviness and therefore the stretch.

In conclusion, the present invention provides a mechanism for opening airbag lids into a module, with a separately mountable and demountable airbag module, in various alternatives. Advantages associated with this are a simple mounting of the airbag module, even though this module, in addition to inflating the airbag, opens inwards into the module prior to the airbag lids, and automatic separation of the airbag module from the opening mechanism during demounting and automatic connection of the module to the opening mechanism of the airbag lids in the event of a crash.

The invention is illustrated in the description and the drawings merely by way of example by way of the exemplary embodiments and is not restricted to these, but embraces all variations, modifications, substitutions and combinations which a person skilled in the art can gather from the present documents, in particular within the scope of the claims and general illustrations in the introduction to this description and also the description of the exemplary embodiments and the illustrations of these in the drawing, and can combine with his specialized knowledge and with the prior art, particularly including the complete disclosure contents of the older applications indicated at the beginning of this description. In particular, all the individual features and design possibilities of the invention and of its exemplary embodiments may be combined.

What is claimed is:

1. An airbag apparatus, comprising:
   an airbag module including an airbag configured to expand by gas inflation;
   at least one covering device having a closing position and an open position;
   said airbag being accommodated behind said at leant one covering device when said at least one covering device is in the closing position:

a mechanism configured to pull said at least one covering device from the closing position to the open position in order to allow an expansion of the airbag;

said mechanism (M) including a first mechanism component (M1), which is firmly connected to the airbag module (B), and a second mechanism component (M2), which is firmly connected to the covering device (K);

said airbag module (B) forming, together with the first mechanism component (M1), a structural assembly to be handled as a structural unit ready for installation; and said second mechanism component being configured to be installed separately from said first mechanism component.

2. The airbag apparatus according to claim 1, wherein, during mounting and demounting, the first mechanism component (M1) and the second mechanism component (M2) do not touch one another and are coupled to one another only in a crash.

3. The airbag apparatus according to claim 1, wherein traction elements, traction ropes. (1) or traction bands (16) are mounted, as integral parts of the second mechanism component (M2), on or within a reinforcing box (4) which supports an orifice (O) for the emergence of the airbag in an instrument panel (V).

4. The airbag apparatus according to claim 3, wherein the traction elements, as integral parts of the second mechanism component (M2), are combined in a hook (5) positioned in relation to at least one driving bolt (10, 15, 19, 22, 27) as an integral part of the first mechanism component (M1), in turn as integral parts of the second mechanism component (M2).

5. The airbag apparatus according to claim 1, wherein the second mechanism component (M2) of the coupling mechanism (M) and coverings thereof are led through pockets (13), which are integrated in an extruded profile of the airbag housing (G), and, on the opposite side, through putaways of a reinforcing box (4).

6. The airbag apparatus according to claim 5, wherein a rope loop or traction band loop (17) and correspondingly shaped or bent driving bolts (15) are provided.

7. A mounting method for an airbag apparatus according to claim 1, wherein the mechanism (M) contains a first mechanism component (M1) which is firmly connected to the airbag module (B), so that the airbag module (B) forms, together with the first mechanism component (M1), a structural assembly to be handled as a structural unit ready for installation, and contains a second mechanism component (M2) which is firmly connected to the covering device (K) and wherein, during or after the installation of the airbag apparatus (A) behind a vehicle interior trim panel, the first mechanism component (M1) is brought into an active position with respect to the second mechanism component (M2).

8. The mounting method according to claim 7, wherein, during or after the installation of the airbag apparatus (A) behind a vehicle interior trim panel, the first mechanism component (M1) and the second mechanism component (M2) are coupled to one another.

9. An operating method for an airbag apparatus according to claim 1, wherein the first mechanism component (M1) and the second mechanism component (M2) are coupled actively to one another only by means of a release of the airbag apparatus.

* * * * *

UNITED STATES PATENT AND TRADEMARK OFFICE
CERTIFICATE OF CORRECTION

PATENT NO. : 6,857,655 B2
DATED : February 22, 2005
INVENTOR(S) : Olaf Müller et al.

It is certified that error appears in the above-identified patent and that said Letters Patent is hereby corrected as shown below:

<u>Title page,</u>
Item [30], Foreign Application Priority Data, should read as follows:
-- Feb. 6, 2001 (DE) .......... 201 01 990 --

Signed and Sealed this

Seventeenth Day of May, 2005

JON W. DUDAS
*Director of the United States Patent and Trademark Office*